(12) United States Patent
Herman et al.

(10) Patent No.: US 6,832,000 B2
(45) Date of Patent: Dec. 14, 2004

(54) AUTOMATIC SEGMENTATION-BASED GRASS DETECTION FOR REAL-TIME VIDEO

(75) Inventors: Stephen Herman, Monsey, NY (US); Johan Janssen, Ossining, NY (US); Erwin Bellers, South Salem, NY (US); James Wendorf, Cortlandt Manor, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 553 days.

(21) Appl. No.: 09/819,290

(22) Filed: Mar. 28, 2001

(65) Prior Publication Data

US 2002/0140815 A1 Oct. 3, 2002

(51) Int. Cl.[7] .................................................. G06K 9/00
(52) U.S. Cl. ...................................... 382/165; 382/164
(58) Field of Search ......................... 382/162, 164–165, 382/167, 170, 171, 173, 224, 228, 263, 266, 274

(56) References Cited

U.S. PATENT DOCUMENTS 6,243,713 B1 * 6/2001 Nelson et al. ........... 707/104.1
6,434,272 B1 * 8/2002 Saarelma ................... 382/224
6,549,660 B1 * 4/2003 Lipson et al. .............. 382/224
6,560,360 B1 * 5/2003 Neskovic et al. .......... 382/181
6,642,940 B1 * 11/2003 Dakss et al. ............... 345/723

OTHER PUBLICATIONS

US 010123—"System and Method for Performing Segmentation–Based Enhancements of A Video Image" by Stephen Herman et al., U.S. patent application Ser. No. 09/819,360.

* cited by examiner

Primary Examiner—Yon J. Couso
(74) Attorney, Agent, or Firm—Laurie E. Gathman

(57) ABSTRACT

Pixels in a video image may be segmented based upon selected criteria, such as a common color, texture, shape, amplitude range or temporal variation. Color values for these pixels may be used to calculate a color probability function which indicates the probability that the color value of the pixel will lie within a designated range of values. The pixels are also used to calculate a texture probability function that indicates whether the pixel represents a designated texture. Pixels that are assigned to a given segment may then be further processed to improve the quality of an image. In this manner, pixels that identify grass, sky, human skin, etc. may be identified and processed in order to achieve a more pleasing appearance.

23 Claims, 5 Drawing Sheets

AUTOMATIC SEGMENTATION-BASED GRASS DETECTION FOR REAL-TIME VIDEO

Cross reference is made to U.S. patent application Ser. No. 09/819,360 entitled "Segmentation-Based Enhancement of Television Images," filed Mar. 28, 2001. U.S. patent application Ser. No. 09/819,360 is commonly assigned to the assignee of the present invention. The disclosures of U.S. patent application Ser. No. 09/819,360 are hereby incorporated by reference in their entirety.

FIELD OF THE INVENTION

This invention relates to segmenting pixels based upon selected criteria. More specifically, the invention relates to classifying pixels based upon their color and texture, to allow for subsequent processing of pixels that receive a common classification.

BACKGROUND OF THE INVENTION

Segmentation of television images is the process wherein each frame of a sequence of images is subdivided into regions or segments. Each segment includes a cluster of pixels that encompass a region of the image with common properties. For example a segment may be distinguished by a common color, texture, shape, amplitude range or temporal variation. Several known methods of image segmentation use a process in which a binary decision determines how the pixels will be segmented. According to such a process, all pixels in a region either satisfy a common criteria for a segment and are therefore included in the segment, or they do not satisfy the criteria are completely excluded. While segmentation methods such as these are satisfactory for some purposes, they are unacceptable for many others. In the case of moving image sequences, small changes in appearance, lighting or perspective may only cause small changes in the overall appearance of the image. However, application of a segmentation method such as that described above tends to allow regions of the image that should appear to be the same to satisfy the segmentation criteria in one frame, while failing to satisfy it in another.

One of the main reasons for segmenting images is to conduct enhancement operations on the segmented portions. When the image is segmented according to a binary segmentation method such as that previously described, the subsequently applied enhancement operations often produce random variations in image enhancement, usually at the edges of the segmented regions. Such random variations in moving sequences represent disturbing artifacts that are unacceptable to viewers. Image enhancement in the television setting includes both global and local methods. While local enhancement methods are known, they are currently controlled by global parameters. For example, an edge enhancement algorithm may adapt to the local edge characteristics, but the parameters that govern the algorithm (e.g. filter frequency characteristics) are global—the enhancement operations that are applied are the same for all regions of the image. The use of global parameters limits the most effective enhancement that can be applied to any given image. Improved enhancement would be available if the algorithm could be trained to recognize the features depicted in different segments of the image and could, therefore, allow the image enhancement algorithms and parameters that are optimum for each type of image feature to be chosen dynamically.

The present invention combines segmentation and local enhancement to provide new enhancement functionality that has not been available within the prior art.

SUMMARY OF THE INVENTION

In one embodiment of the invention, pixels in an image are segmented based upon selected criteria. A signal, such as a baseband video signal, is used to calculate a color probability function for the pixels in the image. This color probability function estimates, for each pixel in the image, the probability that the color value of the pixel will lie within a range of values that represents a designated color. The pixels are also used to calculate a texture probability function that estimates, for each pixel in the image, the probability that the pixel represents a designated texture. Pixels are then segmented based upon the product or other combination of the color probability function and the texture probability function.

In another embodiment, the color probability function is defined as $P_{color}=\exp(-(((y-y_0)\sigma y)^2+((u-u_0)/\sigma u)^2+((v-v_0)/\sigma v)^2))$ and the texture probability function is defined as $P_{texture}=((t/\sqrt{(m*t)})*\exp(-((t-m)/s)^2)$, where y represents a pixel luminance value, u and v represent color coordinates in a YUV color space, t represents the root-mean-square variation of a pixel value luminance in a window surrounding the pixel, m is a value on a luminance scale that describes the location of the peak of the function and s is a value on the same luminance scale that describes the width of the same luminance function.

Other embodiments of the present invention and features thereof will become apparent from the following detailed description, considered in conjunction with the accompanying drawing figures.

While the present invention will be described in connection with certain embodiments thereof, it is to be understood that the invention is not limited to those embodiments. On the contrary, it is intended to cover all alternatives, modifications, and equivalents as may be included within the spirit and scope of the invention as defined by the appended claims.

DETAILED DESCRIPTION OF EMBODIMENTS OF THE INVENTION

The present invention makes use of a method of image segmentation, which defines a continuous, non-binary, function that models the probability that a range of pixels will lie within a desired segment is defined. Such segments could include grass or other green plants, sky, human skin, etc. Pixels in the selected segment can then be enhanced to improve the quality of the image or to alter its appearance. The level of enhancement that is subsequently applied to the segment is a function of the probability measure. In other words, the level of enhancement applied to the image is proportional to the probability that a pixel belongs to a particular segment. The enhancement is allowed to fade out gracefully at the edges of the segments. This allows for such segmentation-based enhancements to be applied to moving images without the frame-to-frame artifacts that result from application of previously known hard segmentation methods.

Figure 1:
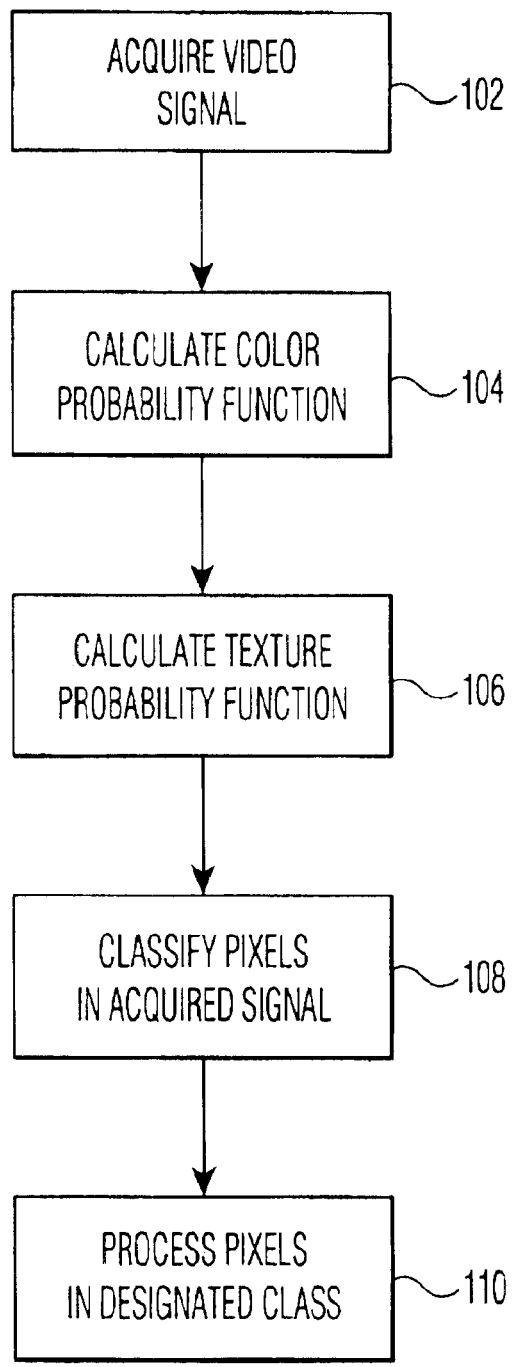
FIG. 1 contains a block diagram that shows steps that may be followed to segment pixels based upon selected criteria in accordance with an embodiment of the invention.

Referring now to the drawings which are provided to describe embodiments of the invention and not for limitation, FIG. 1 contains a diagram that represents the steps that may be followed to segment pixels based upon designated criteria according to the invention. Generally speaking, pixels are discrete light reflecting elements that collectively represent a color image. Each pixel has a value that indicates the color of the image in the represented discrete location. In one embodiment, the pixels are provided by a signal, such as a baseband video signal, as shown in block 102. The signal is used to calculate a color probability function as indicated in block 104. The color probability function estimates, for each pixel in the image, the probability that the value of the pixel will lie within certain designated ranges. More specifically, all colors are defined by the range of wavelengths of visible light that they reflect. For example, blue light reflects wavelengths between about 380 nm and 480 nm and green light reflects those between about 480 nm and 560 nm, while red light, which lies at the other end of the spectrum, reflects wavelengths between about 630 nm and 750 nm. Luminance also plays a part in defining the color of an object. For example, two colors that reflect identical wavelengths of light will have a different appearance if they do not also have the same luminance value. Segments for pixels in an image are often also limited to those that lie within a specific range of luminance values. Thus, the color probability function calculates the probability that a particular pixel will lie within one of the described bounded regions of wavelengths of visible light and that it will lie within a designated range of luminance values.

Still referring to FIG. 1, the acquired signal is also used to calculate a texture probability function as indicated in block 106. This function estimates, for each pixel, the probability that the image at the location represented by the pixel has a designated texture. Thus, the texture of one or more of the various regions in the image can be defined, and pixels in the image can be analyzed to in order to determine whether they meet the criteria for being designated as pixels with the defined texture.

Once the color and texture probability functions are obtained, they can be combined to determine whether the pixel has the color and texture of a designated object as shown in block 108. In one embodiment, the invention is used to identify grass regions in an image. Thus, the designated color will be green, and only pixels that reflect light between about 480 nm and 560 nm will be further considered. The other pixels can be classified as "not grass," and eliminated from further consideration. Pixels that represent grass will typically be green. However it is likely that there will be green pixels in the image that do not represent grass.

Figure 2:
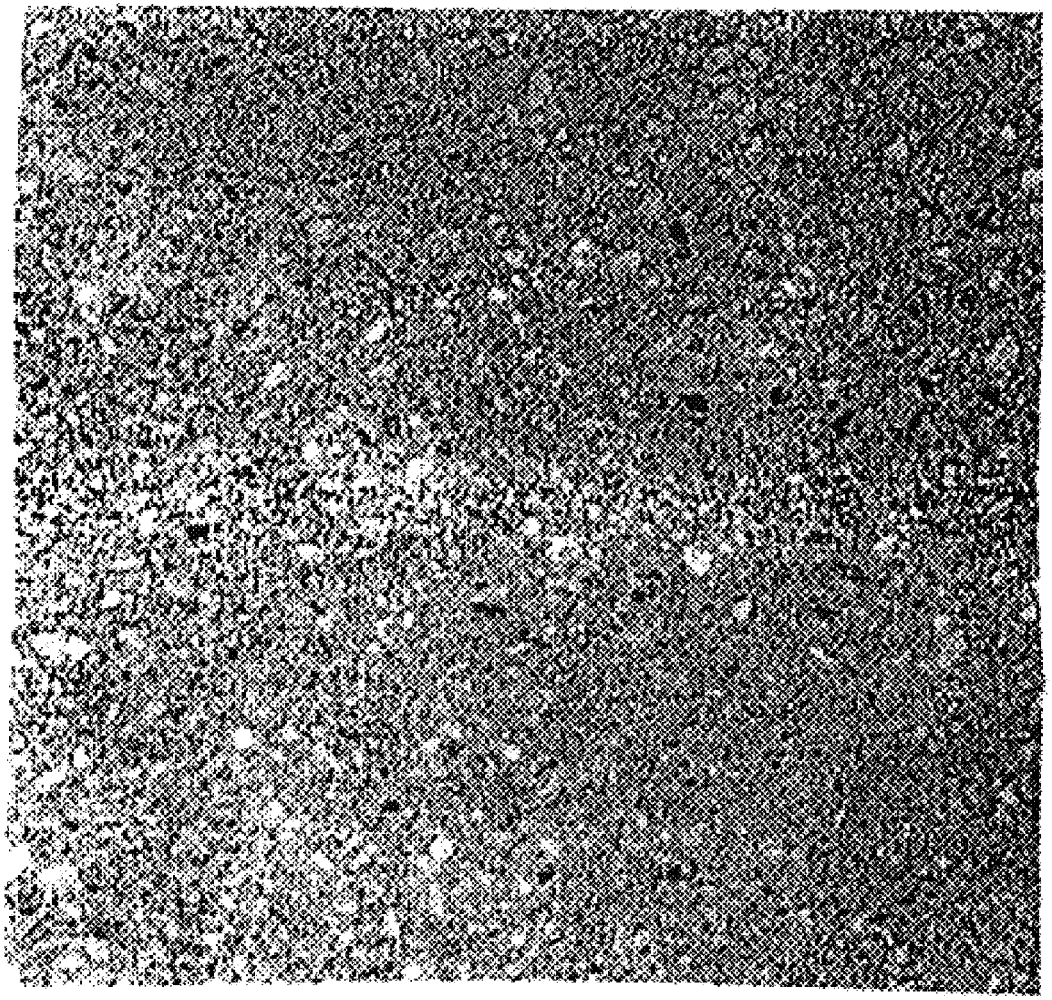
FIG. 2 depicts a smooth textured region of an image.
Figure 3:
FIG. 3 depicts a discontinuous textured region of an image.

Light wavelength may be used to determine pixel color, but pixel texture may be measured in different ways. In one embodiment, texture is measured by the absolute difference of adjacent pixel luminance values. In such a case, a very slight difference will typically indicate a smooth region as illustrated in FIG. 2, while a larger difference will indicate that there are discontinuities in the image and thus, that the pixel lies in a roughly textured region as illustrated in FIG. 3. In another embodiment, texture is measured by calculating the root-mean-square variation of pixel values in a local region. In still another embodiment, texture is measured by obtaining a local histogram of pixel values in each neighborhood of the image. As before, small variations in these values will indicate that the texture of the area represented by the pixels is smooth, while large variations will indicate that they are discontinuous. In any event, in accordance with the invention, only pixels that both reflect green light and have a texture measure that lies within an appropriate range will be selected when it is desired to identify grass in an image.

Turning again to FIG. 1, pixels that are identified as having the required color and texture characteristics can be further processed as shown in block 110 to alter their visual appearance. For example, the color of the pixels that have been classified as grass can be changed to a different shade of green, or the color of the grass can be changed to another color, such as white to indicate the presence of snow or to black to indicate that the grass has been burned. In one embodiment, the high frequency portion of the spatial frequency spectrum could be amplified to give the grass a more textured appearance. In yet another embodiment, the brightness of all pixels with the designated color and texture classifications can be increased to increase their vibrancy. In still another embodiment, the noise processing for all pixels with the designated color and texture classification can be reduced to eliminate unwanted smoothing.

As those skilled in the art will appreciate, black stretch is an image enhancement process which increases overall contrast by darkening pixels that have luminance values that are near zero. While black stretch is generally a useful image enhancement technique, it often appears that holes are present when black stretch is applied to shaded or other darkened regions that include grass. Segmenting the image in accordance with the present invention and applying enhancement techniques to one or more segments can reduce black stretch, thereby eliminating the holes that make these regions of the image disappear in darker areas.

In at least one embodiment of the invention, the color probability function is defined as:

$$P_{color} = \exp(-(((y-y_0)/\sigma y)^2 + ((u-u_0)/\sigma u)^2 + ((v-v_0)/\sigma v)^2))$$

where y represents the value of the luminance of the pixel, and u and v represent the color coordinates in the YUV color space which is commonly used in television systems. In one such embodiment, the parameter $y_0$ is equal to approximately 112, σy is equal to approximately 40, $u_0$ is equal to approximately 110, σu is equal to approximately 8, $v_0$ is equal to approximately 124, and σv is equal to approximately 7. The values of these parameters were derived by adjusting the color in numerous images and examining the YUV coordinates of the grass regions. While the values that have been provided have been used successfully in accordance with the invention, it is to be understood that they are exemplary, and that numerous other values and combinations of values could be used, and that they could be obtained in many ways.

As indicated above, one embodiment of the invention uses a three dimensional Gaussian distribution for the color probability function to conduct soft segmentation. While the invention is described using such a model, it is to be understood that the it could be adapted for use with other mathematical distribution functions as well.

Figure 4:
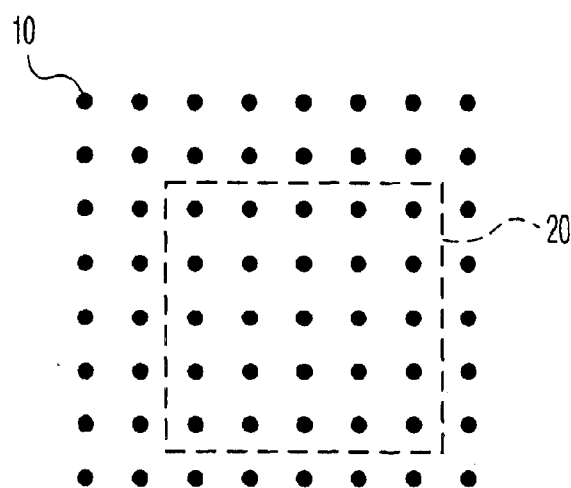
FIG. 4 illustrates how a window may be drawn around a group of pixels to calculate a texture probability function.

In another embodiment, the texture probability function may be provided by the Ricean function, known by those skilled in the art and shown below:

$$P_{texture}=((t/sqrt(m*t))*\exp(-((t-m)/s)^2)$$

where t represents the root-mean-square variation of the luminance in a window (as, for example, illustrated in FIG. 4) that surrounds the pixel (identified with reference numeral 10), m is a value on a luminance scale that describes the location of the peak of the function and s is a value on the same luminance scale that describes the width of the same luminance function. In one embodiment, the window is a 5×5 pixel square. In one embodiment, m is equal to 4, where the peak value of the scale is 255. In one embodiment, s is equal to 5. As before, these values are exemplary. Numerous others can be used successfully in accordance with the invention.

In one embodiment, the parameter t may be obtained by calculating a spatial derivative of a luminance signal, and filtering the luminance signal spatial derivative. In one such embodiment, the spatial derivative is obtained by calculating the difference between a two dimensional luminance signal for the pixel and a neighboring luminance signal, and calculating an absolute value of that difference. In one embodiment, $t_1$ is equal to about 0.3 and; t is equal to about 15.

As stated earlier, in one embodiment, color and texture properties are used to identify grass (and other plants) as being distinct from other image features. It should be noted that color and texture probability functions may be defined in several different color spaces. As already indicated, the functions may be defined in the YUV color space, which may be preferred when television signals are used, since television signals are delivered in YUV form and further transformation to another color space would not be required. In another embodiment, the color probability and texture functions may be defined in the hue-saturation-value (HSV) color space. In still another embodiment, the functions may be defined in a red, green, blue (RGB) color space.

Once the image has been segmented based upon the desired characteristics, the segmented portions can be enhanced to improve the overall quality of the image. As stated earlier, exemplary forms of image enhancement include altering the color of the pixels in the designated segment, increasing their frequency or brightness and reducing their noise processing. Thus, when the image is segmented to identify grass, one possible enhancement algorithm would shift the color of the "grass" segment toward the color of bright green grass, increase the color saturation, increase the luminance and apply edge enhancement. The amount of enhancement that is applied would be proportional to the color and texture probability functions. Thus, if a pixel is erroneously placed in a particular segment, the impact of that error may not be significant. While enhancing grass is an acceptable use of the invention, it is to be understood that the concepts could be applied to enhancing other regions of an image such as sky, human skin, buildings, vehicles, etc.

Figure 5:
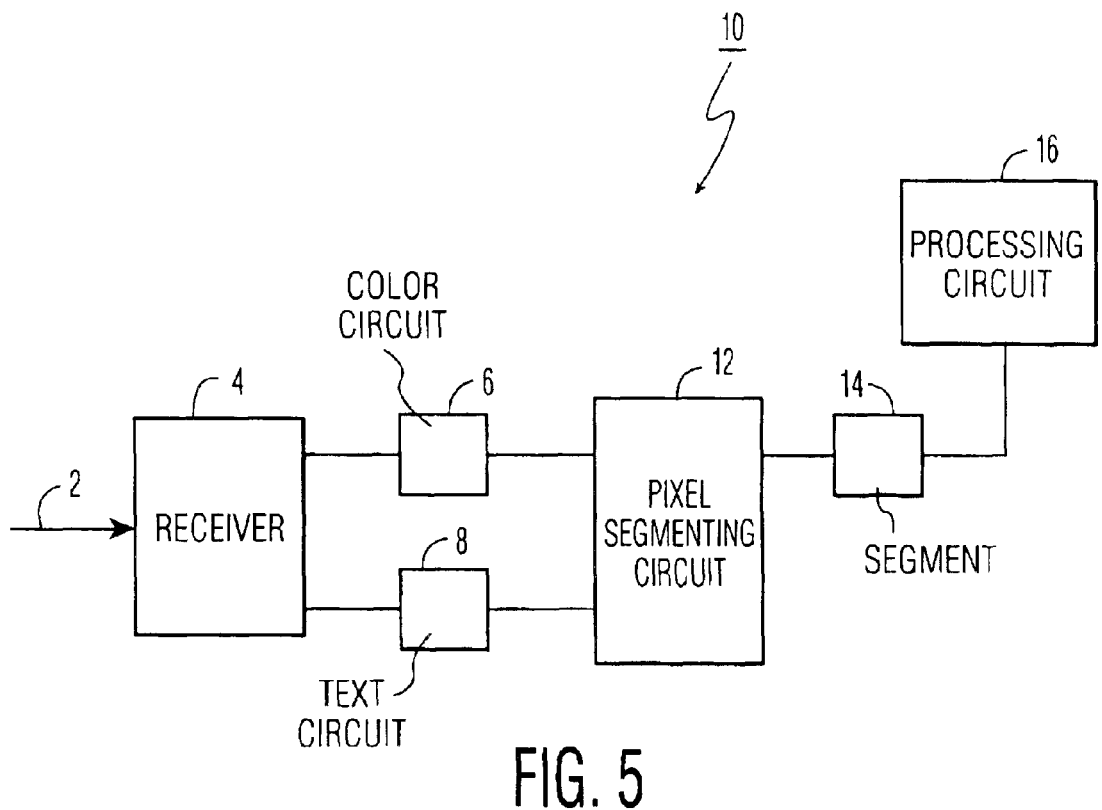
FIG. 5 shows an example of circuitry that may be used to segment pixels in an image, in accordance with an aspect of the invention.
Figure 6A:
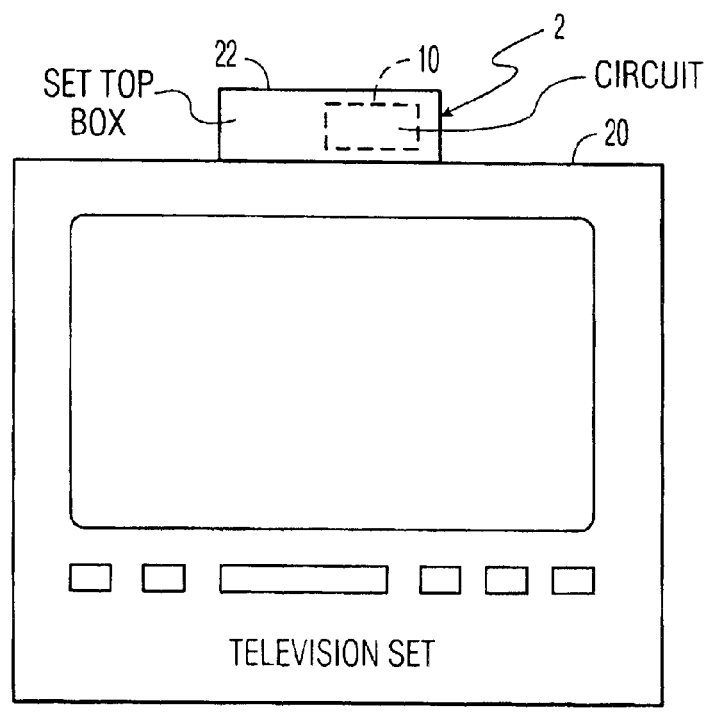
FIG. 6 illustrates how the circuitry of FIG. 5 may be incorporated into a television system to display images in accordance with the invention.
Figure 6B:
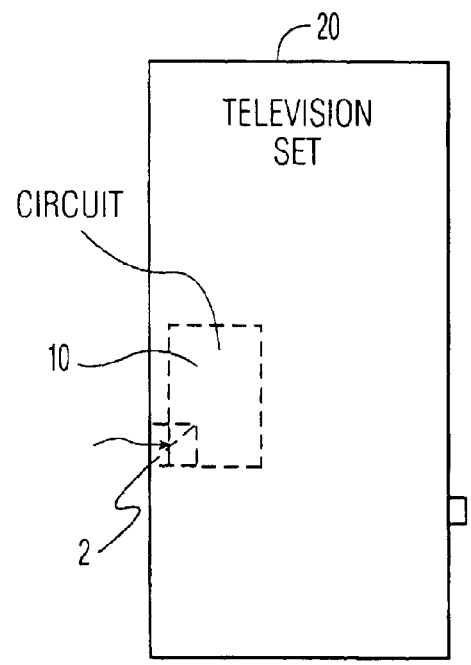

As illustrated in FIG. 5, circuitry 10 for segmenting pixels based upon selected criteria may include a receiver 4, which accepts a signal 2 from a television broadcast studio or other video generating location. Signal 2 is transmitted to color circuit 6 and to texture circuit 8. It should be noted that color circuit 6 and texture circuit 8 can be connected to receiver 4 in parallel as shown in FIG. 5, or they may be connected in series to allow circuits 6 and 8 to process signal 2 sequentially. Output signals generated by color circuit 6 indicate the probability, for each pixel represented in signal 2, that the pixel falls within a designated range of color and luminance values as described earlier. Similarly, output signals generated by texture circuit 8 indicate the probability that the pixel represents an object (or a portion of an object) that has a designated texture. Signals from color circuit 6 and texture circuit 8 are transmitted to pixel segmenting circuit 12, where they are combined to determine whether the pixel will be classified a belonging to a designated segment 14 or as not belonging to the designated segment. Pixels that belong to the designated segment may be transmitted to an additional processing circuit 16. Referring to FIG. 6B, circuitry 10 will typically be linked to a display, which may require being incorporated directly into a television set 20 or incorporated it into a set top box 22 that is connected to a television set 20 as shown in FIG. 6A. In any event, circuitry 10 will typically be placed somewhere between a television broadcast signal 2 and a television tuner. It will typically be placed between a television broadcast signal and a television tuner.

It is, therefore, apparent that there has been provided, in accordance with the present invention, method and system for segmenting pixels based upon selected criteria, for example, such as color and texture. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A method of segmenting pixels in an image based upon selected criteria, comprising:

obtaining a signal that represents color values for pixels in the image;

calculating a color probability function that estimates, for each pixel in the image, the probability that the color value of the pixel will lie within a range of values that represents a designated color;

calculating a texture probability function that estimates, for each pixel in the image, the probability that the pixel represent a designated texture;

classifying each pixel in the based upon a combination of its color probability function and its texture probability function; and processing each pixel in a designated classification, wherein the processing is proportional to said combination of color probability function and texture probability function.

2. A method as claimed in claim 1 wherein said signal is a baseband video signal.

3. A method as claimed in claim 1 wherein said color probability function and said texture probability function are defined in a YUV color space.

4. A method as claimed in claim 3 wherein said color probability function is defined as $P_{color}=\exp(-(((y-y_0)/\sigma y)^2+((u-u_0)/\sigma u)^2+((v-v_0)/\sigma v)^2))$ where y represents a pixel luminance value, and u and v represent color coordinates in a YUV color space.

5. A method as claimed in claim 4 wherein $y_0$ is equal to about 112, $\sigma y$ is equal to about 40, $u_0$ is equal to about 110, $\sigma u$ is equal to about 8, $v_0$ is equal to about 124, and $\sigma v$ is equal to about 7.

6. A method as claimed in claim 3 wherein said texture probability function is defined as $P_{texture}=((t/sqrt(m*t))*\exp(-((t-m)/s)^2)$, where t represents a root-mean-square variation of a pixel value luminance in a window surrounding the pixel, m is a value on a luminance scale that describes the location of a peak of the function and s is a value on said luminance scale that describes a width of said luminance function.

7. A method as claimed in claim 6, wherein said window is a 5×5 pixel square, m is equal to 4 on a luminance scale with a peak value of 255 and s is equal to 5.

8. A method as claimed in claim 6 further comprising obtaining the parameter t further comprises:
    calculating a spatial derivative of a luminance signal; and
    filtering said luminance signal spatial derivative.

9. A method as claimed in claim 8 wherein said spatial derivative calculating step further comprises calculating a difference between a two dimensional luminance signal for the pixel and a neighboring luminance signal, and calculating an absolute value of said difference.

10. A method as claimed in claim 6 wherein $m_1$ is equal to about 0.3 and $\sigma t$ is equal to about 15.

11. A method as claimed in claim 1 wherein combining said color probability function and said texture probability function further comprises calculating a product of said color probability function and said texture probability function.

12. A method as claimed in claim 1 wherein said processing comprises altering the color of all pixels with said designated classification.

13. A method as claimed in claim 1 wherein said processing comprises increasing the frequency of all pixels with said designated classification.

14. A method as claimed in claim 1 wherein said processing comprises increasing the brightness of all pixels with said designated classification.

15. A method as claimed in claim 1 wherein said processing comprises reducing the noise processing for all pixels with said designated classification.

16. A method as claimed in claim 1 wherein at least some of said pixels are classified as representing grass.

17. A method as claimed in claim 1 wherein said color probability function and said texture probability function are defined in a HSV color space.

18. A device for segmenting a received video image signal based upon selected criteria, wherein the video image signal directs illumination of pixels on a video display, comprising:
    a receiver that accepts the video image signal;
    a color circuit that generates an output for a plurality of pixels, based upon a probability that a pixel luminance value and a pixel color value lie within designated ranges, wherein said color probability is defined as $P_{color}=\exp(-(((y-y_0)/\sigma y)^2+((u-u_0)/\sigma u)^2+((v-v_0)/\sigma v)^2))$ where y represents said pixel luminance value, and u and v represent color coordinates in a YUV color space;
    a texture circuit that generates an output for said plurality of pixels, based upon a probability that said pixels represent at least a portion of an object that has a designated texture, wherein said texture probability is defined as $P_{texture}=((t/\sqrt{m*t}))*\exp(-((t-m)/s)^2)$, where t represents a root-mean-square variation of a pixel value luminance in a window surrounding the pixel, m is a value on a luminance scale that describes the location of a peak of the function and s is a value on said luminance scale that describes a width of said luminance function; and
    a pixel segmenting circuit which separates said pixels into at least two classes, based upon a product of said color circuit output and said texture circuit output.

19. A method of segmenting pixels in an image based upon selected criteria, comprising:
    obtaining a baseband video signal;
    using a function defined as $P_{color}=\exp(-(((y-y_0)/\sigma y)^2+((u-u_0)/\sigma u)^2+((v-v_0)/\sigma v)^2))$ where y represents a pixel luminance value, and u and v represent color coordinates in a YUV color space to calculate a color probability function for pixels in said baseband video signal, wherein said color probability function estimates, for each pixel in the image, the probability that the color value of the pixel will lie within a range of values that represents a designated color;
    using a function defined as $P_{texture}=((t/\sqrt{m*t}))*\exp(-((t-m)/s)^2)$, where t represents a root-mean-square variation of a pixel value luminance in a window surrounding the pixel, m is a value on a luminance scale that describes the location of a peak of the function and s is a value on said luminance scale that describes a width of said luminance function to calculate a texture probability for said baseband video signal, wherein said texture probability function estimates, for each pixel in the image, the probability that the pixel represent a designated texture; and
    classifying each pixel in the image based upon a product of its color probability function and its texture probability function.

20. A method of segmenting pixels in an image based upon selected criteria, comprising:
    obtaining a signal that represents color values for pixels in the image;
    calculating a color probability function that estimates, for each pixel in the image, the probability that the color value of the pixel will lie within a range of values that represents the color green;
    calculating a texture probability function that estimates, for each pixel in the image, the probability that the pixel represent a designated texture;
    classifying at least some of said pixels as representing grass based upon a combination of their color probability function and their texture probability function; and
    processing said pixels classified as representing grass, wherein the processing is proportional to said combination of color probability function and texture probability function.

21. A device for segmenting a received video image signal based upon selected criteria, wherein the video image signal directs illumination of pixels on a video display, comprising:
    a receiver that accepts the video image signal;
    a color circuit that generates a signal that indicates a probability that a pixel luminance value and a pixel color value lie within designated ranges;
    a texture circuit that generates a signal that indicates a probability that a pixel represents at least a portion of an object that has a designated texture;
    a pixel segmenting circuit that separates said pixels into at least two classes based upon a combination of said color circuit signal and said texture circuit signal; and
    a processing circuit that enhances pixels in a one of said at least two classes, wherein the enhancement is proportional to said combination of said color circuit signal and said texture circuit signal.

22. A device as claimed in claim 21 wherein said color circuit signal is defined by the function $P_{color}=\exp(-(((y-y_0)/\sigma y)^2+((u-u_0)/\sigma u)^2+((v-v_0)/\sigma v)^2))$ where y represents said pixel luminance value, and u and v represent color coordinates in a YUV color space.

23. A device as claimed in claim 21 wherein said texture circuit signal is defined by the function $P_{texture} = ((t/\sqrt{m*t})) * \exp(-((t-m)/s)^2)$, where t represents a root-mean-square variation of a pixel value luminance in a window surrounding the pixel, m is a value on a luminance scale that describes the location of a peak of the function and s is a value on said luminance scale that describes a width of said luminance function.

* * * * *